(12) United States Patent
Meckel

(10) Patent No.: US 7,056,415 B2
(45) Date of Patent: Jun. 6, 2006

(54) WOOD ADHESIVES

(75) Inventor: Walter Meckel, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 367 days.

(21) Appl. No.: 10/014,053

(22) Filed: Dec. 11, 2001

(65) Prior Publication Data

US 2002/0117260 A1    Aug. 29, 2002

(30) Foreign Application Priority Data

Dec. 14, 2000    (DE) ................. 100 62 415

(51) Int. Cl.
  *C08G 18/10*    (2006.01)
  *C08G 18/40*    (2006.01)
(52) U.S. Cl. ............... 156/331.4; 156/331.7; 524/589
(58) Field of Classification Search ............ 156/331.4, 156/331.7; 524/589; 528/52, 61, 62
  See application file for complete search history.

(56) References Cited

U.S. PATENT DOCUMENTS

| 4,193,832 | A |   | 3/1980  | Reischl et al. ............ 156/331 |
| 4,389,519 | A | * | 6/1983  | Yamazaki et al. ........... 528/73 |
| 4,515,646 | A | * | 5/1985  | Walker et al. ............. 156/78 |
| 4,535,121 | A | * | 8/1985  | Oezelli et al. ............ 524/715 |
| 5,349,040 | A | * | 9/1994  | Trinks et al. ............. 528/75 |
| 5,384,385 | A |   | 1/1995  | Trinks et al. ............. 528/52 |
| 5,700,891 | A | * | 12/1997 | Huver et al. .............. 526/73 |
| 5,852,103 | A | * | 12/1998 | Bhat ...................... 524/590 |
| 5,880,167 | A | * | 3/1999  | Krebs et al. ............. 521/155 |
| 6,133,398 | A | * | 10/2000 | Bhat et al. ............... 528/60 |

FOREIGN PATENT DOCUMENTS

| EP | 0 443 157 A1 | 8/1991 |
| EP | 0 879 270    | 11/1998 |
| GB | 1453258      | 10/1976 |

* cited by examiner

*Primary Examiner*—Sam Chuan Yao
(74) *Attorney, Agent, or Firm*—Joseph C. Gil; Thomas W. Roy

(57) ABSTRACT

The present invention relates to a process for bonding two or more wood substrates by using as the adhesive isocyanate-terminated prepolymers having an isocyanate content of 8 to 20 wt. % and containing the reaction product of a) at least one organic polyisocyanate with b) at least one organic polyhydroxyl compound containing the reaction products of i) organic polyisocyanates with ii) polyamines, hydrazines and/or hydrazides having primary and/or secondary amino groups dispersed in a iii) polyethers having at least two hydroxyl groups and a number average molecular weight of 500 to 12,000; and, the present invention also relates to the bonded substrates obtained by this process.

14 Claims, No Drawings

WOOD ADHESIVES

BACKGROUND OF THE INVENTION

1. Field of the Invention

The present invention relates to the use of isocyanate-terminated prepolymers as wood adhesives.

2. Description of the Prior Art

Adhesives based on phenol- or resorcinol- or melamine formaldehyde condensates are known and are used to bond wood, in particular in highly loaded wooden structures with long lifetimes (e.g. EP-A 0 879 270). The reaction of the aqueous hardener mix with the melamine resin is a polycondensation reaction, in which water is released as the polymer is built up. In order for the reaction to be reproducible, the water content of the wood must therefore meet strict requirements.

In the case of highly loaded wooden structures such as load-bearing components, great demands are made on the mechanical strength of the components. For example, the bond should remain sufficiently strong even after many years of weathering.

The general usefulness of adhesives is determined by the fulfilment of standards, such as DIN EN 204, loading group D4 or WATT 91 (Wood Adhesives Temperature Test).

The bonding of wood with polyurethane adhesives both as a one-component and two-component system is known and is described in the journal "Ahäsion—kleben&dichten", [Adhesion—bonding and sealing] 41, 1-2/97, pg.37–38 (1997). One-component systems are suitable in particular for wood substrates, as the natural moisture content of the wood ensures that sufficient water is available as a reactant. Thus, there is no need to check the water content precisely or, as is usual with many water-impermeable substrates, to mist the surface of the substrate with water to ensure a complete reaction.

However, a disadvantage of both one- and two-component systems is that when low viscosity polyisocyanates are used they migrate into the wood during the compression process. Although this produces a good bond between adhesive and wood, too great a degree of migration results in an uncontrolled shift in the NCO/OH ratio, which is important for the polymer structure. The resulting lack of polyisocyanate in the adhesive in the bonded joint may, in the extreme, lead to faulty bonds.

To ensure a sufficient concentration of adhesive in the bonded joint, higher viscosity systems can be used, but these may pose problems for application. Another possibility is to add fillers. Suitable fillers include organic fillers. Mineral fillers are less suitable because they have a strong tendency to form sediment and may produce increased abrasion in the complex pumping and dosing systems if fed automatically.

Wood dust, cellulose fibers, and also plastic fibers may be used as organic fillers. Plastic fibers in the form of microshort-fibers also act as a thixotropy additive. Particularly suitable fillers are dispersions produced in situ of polyureas and/or polyhydrazodicarbonamides in polyethers having hydroxyl groups, which are generally used to produce polyurethane foams with increased compressive stress values (e.g. DE-OS 25 13 815).

For flexible bonds with excellent cohesive strength, both one-component and two-component polyurethane adhesives based on organic polyisocyanates and dispersions of polymers in organic hydroxyl compounds are used, for example as described in DE-OS 27 19 720.

A substantial disadvantage of bonded wooden structures is the susceptibility of the adhesive to moisture, which weakens the adhesive layer, thus restricting the use of bonded wooden structures in continuously damp environments. The result of this is that extensive adherent failure can often be detected in the wood in its dry state, while cohesive failure is observed after lengthy immersion in water or in the boiling water test.

An object of the present invention is to provide a one-component wood adhesive, in particular for bonding load-bearing components, based on isocyanate-terminated prepolymers, which has improved water resistance.

It was surprisingly found that fillers based on polyaddition products of, for example, toluylene diisocyanates and hydrazine hydrate (polyhydrazodi-carboxylic acid amides) are beneficial to the wet resistance of wood. Since hydrazodicarboxylic acid amide structures are suitable for the formation of hydrogen bridges, a certain amount of hydrophilicity and thus poorer wet resistance would have been expected.

SUMMARY OF THE INVENTION

The present invention relates to a process for bonding two or more wood substrates by using as the adhesive isocyanate-terminated prepolymers having an isocyanate content of 8 to 20 wt. % and containing the reaction product of
a) at least one organic polyisocyanate with
b) at least one organic polyhydroxyl compound containing the reaction products of
  i) organic polyisocyanates with
  ii) polyamines, hydrazines and/or hydrazides having primary and/or secondary amino groups dispersed in a
  iii) polyethers having at least two hydroxyl groups and a number average molecular weight of 500 to 12,000.

The present invention also relates to the bonded substrates obtained by this process.

DETAILED DESCRIPTION OF THE INVENTION

The isocyanate-terminated prepolymer preferably has an NCO content of 10 to 18 wt. %.

The reaction products of b-i) with b-ii) used according to the invention are polyureas and/or polyhydrazodicarbonamides; the isocyanate-terminated prepolymer should contain no less than 2, preferably no less than 5 wt. % of these reaction products. The content is 2 to 25 wt. %, preferably 5 to 15 wt. %, based on the total weight of NCO prepolymer.

Suitable polyisocyanates, preferably diisocyanates, (i) for the production of dispersed polyaddition products include hexamethylene diisocyanate, 2,4- and/or 2,6-diisocyanatotoluene, 3,3,5-trimethyl-5-isocyanatomethyl-cyclohexyl isocyanate, 4,4'-diphenylmethane diisocyanate, optionally in mixture with 2,4'-MDI and its higher oligomers. The mixture of 2,4- and 2,6-diisocyanatotoluene in a weight ratio of 80 to 20 is preferred.

Suitable compounds ii) having isocyanate-reactive groups include di- and/or polyvalent, primary and/or secondary aliphatic, araliphatic, cycloaliphatic and aromatic amines. Examples include ethylene diamine, hexamethylene diamine, trimethyl diaminohexane, N,N'-dimethyl ethylene diamine, higher homologs of ethylene diamine such as diethylene triamine, homologs of propylene diamine such as dipropylene triamine, piperazine, triazine, 4-aminobenzyl amine, 4,4'-diaminodicyclohexyl methane or propane, 1,4-diaminocylohexane, phenylene diamines, condensates of aniline and formaldehyde, toluylene diamines and bis-aminomethyl-benzenes. Hydrazine is also suitable, as are monoor N,N'-disubstituted hydrazines and hydrazides such as hydrazides of di- or polyvalent carboxylic acids. Hydrazine hydrate is preferred.

Suitable polyethers (iii) having at least two hydroxyl groups include polyaddition products of propylene oxide and/or ethylene oxide on bi- and tri-functional initiators or mixtures thereof. Examples include water, 1,2-propylene glycol, trimethylol propane, glycerine, pentaerythritol. Other suitable polyhydroxyl compounds include polyether-polyols based on tetrahydrofurane (polytetramethylene etherglycol) or natural oils containing hydroxyl groups (e.g. castor oil). Mixtures of such polyhydroxyl compounds can also be used.

The reaction products of b-i) with b-ii) are polyureas and/or polyhydrazodicarbonamides, which are present in polyethers b-iii) at a concentration of 5 to 40 wt. %, preferably 10 to 25 wt. %, based on the weight of component b).

The sedimentation-stable, fine-particle polyurea- and/or polyhydrazodicarbonamide particles incorporated as dispersions into polyethers having hydroxyl groups, have a particle size of 0.01 to 10, preferably 0.01 to 1 μm. The viscosities of dispersions b) containing fillers is less than 10,000, preferably less than 3000 mPa·s at 25° C. and a solids content of 20 wt. %.

In a preferred embodiment of the use according to the invention, dispersion b) contains the reaction product of
i) 16.9 parts by weight of a mixture of 2,4- and 2,6-diisocyanato toluene in a ratio of 80 to 20 with
ii) 4.85 parts by weight hydrazine hydrate in
iii) 80 parts by weight of a polypropylene ether polyol (iii) with a functionality greater than 2 and an ethoxy group content of 0 to 30, preferably 5 to 20 wt. % and a hydroxyl number of 20 to 56, preferably 30 to 40 mg KOH/g.

The filled polypropylene ether polyol used according to the invention is sold, e.g. by Bayer AG, Leverkusen under the commercial name Baycoll BT 5028.

Suitable polyisocyanates for preparing the isocyanate-terminated prepolymers include the aliphatic, cycloaliphatic, aromatic and heterocyclic polyisocyanates known from polyurethane chemistry, as described e.g. by W. Siefgen in Justus Liebig's Annalen der Chemie [Annals of Chemistry] 562, pages 75 to 136. Polyisocyanates containing isocyanurate, biuret, uretdione and/or carbodiimide groups are also suitable as polyisocyanates. These polyisocyanates can have high functionalities of more than 3.

Preferred diisocyanates are 2,4- and/or 2,6-diisocyanato toluene and 2,4'- and/or 4,4'-diisocyanato diphenylmethane or polyisocyanates obtained by the phosgenation of aniline/formaldehyde condensates. These condensates are known as polymeric MDI (P-MDI) and are a mixture of the monomeric 2,2'-, 2,4'- and 4,4'-diphenylmethane diisocyanates with higher oligomers (polydiphenylmethane polyisocyanate). Mixtures of monomeric diphenylmethane diisocyanates and P-MDI can also be used.

To produce the NCO prepolymer, the polymer dispersion is reacted with the organic polyisocyanate. The NCO prepolymer can then be processed as an adhesive which hardens under the influence of moisture.

To produce the NCO prepolymer, 3 to 30, preferably 5 to 20, isocyanate groups are added for each isocyanate-reactive group. The content of polyol component b) in the finished NCO prepolymer is 20 to 75 wt. %, preferably 30 to 60 wt. %. The content of the polyisocyanate component a) is 25 to 80 wt. %, preferably 40 to 70 wt. %.

To produce the prepolymers the excess component, the polyisoyanate a) is generally placed into the boiler at a temperature of 50 to 70° C. and the polyol component b) is added in such a way that the boiler temperature does not exceed 80° C. It is also possible to mix polyisocyanates a) and polyols b) intensively using a mixer (e.g. a static mixer, dynamic mixer or high-pressure nozzles) and allow them to react.

Preferred prepolymers are obtained from organic polyisocyanates a) having a content of 0 to 60 wt. %, preferably 5 to 40 wt. % difunctional 2,4'-MDI and a content of 0 to 50 wt. %, preferably 0 to 40 wt. %, of higher oligomers having a functionality greater than 2. The 2,4'-MDI content in particular helps to increase the storage stability of the prepolymers.

It is possible, when producing the NCO prepolymers for the use according to the invention either
(I) to use directly an organic polyisocyanate a) which contains 2,4'-MDI, and has an oligomer content of 20 to 60 wt. % (P-MDI) or
(II) to begin by carrying out the reaction with a pure diisocyanate which contains 40 to 60 wt. % of 2,4'-MDI, up to an NCO content of 8 to 11 wt. % and then to add a P-MDI with an oligomer content of up to 70 wt. %, so that the mixture has an NCO content of 14 to 18 wt. %.

The prepolymer produced according to (II) has a lower viscosity than the prepolymer which is obtained according to (I).

The resulting NCO prepolymers have viscosities at 25° C. of less than 20,000, preferably less than 10,000 mPa·s.

The simultaneous use of up to 20 parts by weight of amine-initiated polypropylene-/ethyleneetherglycols in component b), for example, can be advantageous because they accelerate the reaction of the prepolymer with atmospheric humidity. Ethylene diamine- or ammonia-initiated polypropylene ether polyols having an OH number of 40 to 200 mgKOH/g are preferred.

The reaction with atmospheric humidity can also be accelerated with the known catalysts from polyurethane chemistry. Examples include tertiary amines, such as diazabicyclooctane and dimorpholino diethylether, or metal catalysts, such as dibutyl tin dilaurate, in quantities of 0.005 to 0.5 wt. %, based on the weight of the prepolymer.

Known additives can be added to the prepolymers. Examples include thickening agents such as surface-hydrophobized aerosils, short fibers such as Kevlar pulp or similar microfibers as thixotropes, natural or synthetic resins, pigments and anti-aging agents.

The adhesives used according to the invention are characterised in that they retain adequate adherent failure even after immersion in water for several days at 20° C. They are suitable in particular for bonding highly-loaded components, such as load-bearing wooden structures.

The invention is further illustrated but is not intended to be limited by the following examples in which all parts and percentages are by weight unless otherwise specified.

EXAMPLES

Prepolymer Production

The polyisocyanates were added at 70° C. and the de-watered polyols (water content <0.05%) were added such that the temperature was maintained at 60 to 80° C.

After obtaining a constant NCO content, the prepolymer was set to a film drying time of approximately 30 to 60 minutes, by the addition of dibutyl tin dilaurate, if necessary.

The film drying time was determined with a BK Drying Recorder (Type 10) from Mickle Laboratory Engineering Co. Ltd (measuring conditions: 23° C., 50% atmospheric humidity, 100 mm adhesive film and 10 g weight).

Polyols

Polyol I    Baycoll BT 5028 (Bayer AG, Leverkusen): a polypropylene ether polyol having an OH number of 28.6 mg KOH/g obtained according to DE-OS 2513815. The polyether polyol contains 20 wt. % of a reaction product of toluylene diisocyanate and hydrazine hydrate in the form of a fine particle, sedimentation-stable dispersion in a trifunctional polyether having an OH number of 35.
Polyol II   Baycoll BT 5035 (Bayer AG, Leverkusen): a polypropylene ether glycol having an OH number of 35 mg KOH/g initiated with glycerine, ethylene oxide content approx. 20 wt. %.
Polyoll III Baycoll BD 2060 (Bayer AG, Leverkusen): a polypropylene ether glycol having an OH number of 56 mg KOH/g.
Polyol IV   Baycoll BD 1110 (Bayer AG, Leverkusen): a polypropylene ether glycol having an OH number of 112 mg KOH/g.
Polyol V    Baycoll ET 3059 (Bayer AG, Leverkusen): an amine-initiated polypropylene ether polyol having an OH number of 56 mg KOH/g.
Polyol VI   Arcol 1096 (Lyondell, USA): a polypropylene ether polyol having an OH number of 28 mg KOH/g and containing 40 wt. % of a styrene-acrylonitrile polymer in the form of a fine-particle, sedimentation-stable dispersion in a trifunctional polyether.
Polyol VII  Terathane 2000 (Dupont, Europe): a polytetramethylene ether glycol having an OH number of 112 mgKOH/g.

Polyisocyanates

Iso-I    Desmodur VP KA 8616 (Bayer AG, Leverkusen) (monomeric MDI): mixture of 54 wt. % 2,4'-MDI and 46 wt. % 4,4'-MDI.
Iso-II   Desmodur VKS 20 F (Bayer AG, Leverkusen) (polymeric MDI) with an NCO content of 31.6% and a polymer content of 50 wt. %.
Iso-III  Desmodur VK 5 (Bayer AG, Leverkusen) (polymeric MDI) with an NCO content of 32.6% and a polymer content of 10 wt. % and a 2,4'-MDI content of 45%.
Iso-IV   DesmodurVK 10 (Bayer AG, Leverkusen) (polymeric MDI) with an NCO content of 31.5% and a polymer content of 38 wt. % and a 2,4'-MDI content of 17 wt. %.

Example 1 (According to the Invention)

An NCO prepolymer with an NCO content of 14.67% and a viscosity of 6500 mPa·s at 23° C. was obtained from 589 g of Pol-I and 611 g of ISO-IV.

A film drying time (FDT) of 45 minutes was obtained with 0.01% wt. % dibutyl tin dilaurate.

Example 2 (Comparison)

An NCO prepolymer with an NCO content of 15.16% and a viscosity of 7600 mPa·s at 23° C. was obtained from 292 g of Pol-II, 291 g of Pol-VI and 617 g of ISO-IV.

A film drying time (FDT) of 37 minutes was obtained with 0.01% wt. % dibutyl tin dilaurate.

Example 3 (Comparison)

An NCO prepolymer with an NCO content of 16.10% and a viscosity of 5600 mPa·s at 23° C. was obtained from 152 g of Pol-III, 280 g of Pol-V and 400 g of ISO-II and 170 g of Iso-III.

The film drying time (FDT) was 56 minutes.

Example 4 (Comparison)

An NCO prepolymer with an NCO-content of 15.60% and a viscosity of 1950 mPa·s at 23° C. was obtained from 222 g of Pol-IV, 222 g of Pol-V and 556 g of ISO-I.

The film drying time (FDT) was 58 minutes.

Example 5 (Comparison)

An NCO prepolymer with an NCO content of 13.40% and a viscosity of 6500 mPa·s at 23° C. was obtained from 490 g of Pol-III and 357 g of Iso-II and 170 g of Iso-III.

After the addition of 0.2% tosylisocyanate and 0.25% dibutyl tin dilaurate, a film drying time (FDT) of 43 minutes was obtained.

Example 6 (Comparison)

An NCO prepolymer with an NCO content of 16.10% and a viscosity of 3100 mPa·s at 23° C. was obtained from 371 g of Pol-VII, 15 g of trimethylol propane and 614 g of ISO-I and 170 g of Iso-II.

The film drying time (FDT) after addition of 0.015% DBTL was 42 minutes.

Wood Bonds

The adhesives were given to the Institut für Fenstertechnik e.V. [Institute for Window Technology] in Rosenheim to test according to DIN EN 204, Loading Group D4 and WATT 91.

In each case 20 standard-compliant test pieces were produced and tested. The following results were obtained:

TABLE 1

Test results

| Test | Example 1 $N/mm^2$/ % AF | Example 2 (comp) $N/mm^2$/ % AF | Example 3 (comp) $N/mm^2$/ % AF | Example 4 (comp) $N/mm^2$/ % AF | Example 5 (comp) $N/mm^2$/ % AF | Example 6 (comp) $N/mm^2$/ % AF |
|---|---|---|---|---|---|---|
| Storage 1 | 10.83 100 | 11.56 100 | 10.46 100 | 11.53 100 | 10.80 100 | 10.52 100 |
| Storage 3 | 7.98 60–90 | 7.03 0 | 5.12 0 | 5.61 0 | 5.89 0 | 4.97 0 |
| Storage 5 | 4.87 0–100 | 6.73 0 | 6.43 0 | 5.96 0 | 6.55 0–75 | 7.23 0 |
| Storage 6 | 12.43 100 | 12.18 100 | 10.48 100 | 10.02 100 | 10.08 100 | 12.88 100 |
| WATT 91 | 11.74 100 | 14.02 50–100 | 12.71 100 | 10.00 0–30 | 12.84 0–100 | 12.30 100 |

Storage 1: 7 days at standard reference atmosphere (20° C. and 65% relative humidity, RH)
Storage 3: 7 days at standard reference atmosphere; 4 days in cold water (20° C.)
Storage 5: 7 days at standard reference atmosphere; 6 hours in boiling water; 2 hours in cold water
Storage 6: 7 days at standard reference atmosphere; 6 hours in boiling water; 2 hours in cold water; 7 days at standard reference atmosphere
WATT 91: 1 hour stored at 80° C. and hot splitting
$N/mm^2$ Adhesive strength in the shear tension test at a feed rate of 50 mm/min.
AF: Adherent failure as % of bonded surface.

The table shows that although DIN EN 204, loading D4 was fulfilled by all of the prepolymers, only the NCO prepolymer according to the invention retained considerable adherent failure during lengthy storage in water (storage 3).

The prepolymer according to the invention also performed very well in the heat test (WATT 91).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for bonding two or more wood substrates, the improvement which comprises adhesively bonding two or more wood substrates using as an one component adhesive an isocyanate-terminated prepolymer having an isocyanate content of 8 to 20 wt. % and containing the reaction product of
   a) at least one organic polyisocyanate with
   b) at least one organic polyhydroxyl compound containing the reaction product of
      i) an organic polyisocyanate with
      ii) a polyamine, hydrazine and/or a hydrazide having primary and/or secondary amino groups dispersed in
      iii) a polyether having at least two hydroxyl groups and a number average molecular weight of 500 to 12,000.

2. The process of claim 1 wherein the reaction product of b-i) with b-ii) is a polyurea and/or a polyhydrazo dicarbonamide and is present in an amount of 2 to 25 wt. %, based on the weight of the isocyanate-terminated prepolymer.

3. The process of claim 1 wherein the reaction product of b-i) with b-ii) is a polyurea and/or a polyhydrazo dicarbonamide particles and has a particle size of 0.01 to 10 µm.

4. The process of claim 1 wherein the reaction product of b-i) with b-ii) is present at a concentration of 5 to 40 wt. %, based on the weight of component b).

5. The process of claim 1 wherein component b) comprises the reaction product of 16.9 parts by weight of a mixture of 2,4- and 2,6-diisocyanatotoluene in a weight of 80 to 20 with 4.85 parts by weight of hydrazine hydrate in 80 parts by weight of a polypropylene ether polyol with a functionality of greater than 2.

6. The process of claim 1 wherein polyether iii) comprises polypropylene ether polyol having an ethoxy group content of 0 to 30 wt. % and a hydroxyl number of 20 to 56 mg KOH/g.

7. The process of claim 1 wherein organic polyisocyanate a) is obtained by the phosgenation of aniline/formaldehyde condensates, and contains 0 to 60 wt. % of difunctional 2,4'-diisocyanato-diphenylmethane and 0 to 50 wt. % of higher oligomers having a functionality of greater than 2.

8. Two or more wood substrates bonded together with an one component adhesive comprising an isocyanate-terminated prepolymer having an isocyanate content of 8 to 20 wt. % and containing the reaction product of
   a) at least one organic polyisocyanate with
   b) at least one organic polyhydroxyl compound containing the reaction product of
      i) an organic polyisocyanate with
      ii) a polyamine, hydrazine and/or a hydrazide having primary and/or secondary amino groups dispersed in
      iii) a polyether having at least two hydroxyl groups and a number average molecular weight of 500 to 12,000.

9. The bonded substrates of claim 8 wherein the reaction product of b-i) with b-ii) is a polyurea and/or a polyhydrazo dicarbonamide and is present in an amount of 2 to 25 wt. %, based on the weight of the isocyanate-terminated prepolymer.

10. The bonded substrates of claim 8 wherein the reaction product of b-i) with b-ii) is a polyurea and/or a polyhydrazo dicarbonamide particles and has a particle size of 0.01 to 10 µm.

11. The bonded substrates of claim 8 wherein the reaction product of b-i) with b-ii) is present at a concentration of 5 to 40 wt. %, based on the weight of component b).

12. The bonded substrates of claim 8 wherein component b) comprises the reaction product of 16.9 parts by weight of a mixture of 2,4- and 2,6- diisocyanatotoluene in a weight of 80 to 20 with 4.85 parts by weight of hydrazine hydrate in 80 parts by weight of a polypropylene ether polyol with a functionality of greater than 2.

13. The bonded substrates of claim 8 wherein polyether iii) comprises polypropylene ether polyol having an ethoxy group content of 0 to 30 wt. % and a hydroxyl number of 20 to 56 mg KOH/g.

14. The bonded substrates of claim 8 wherein organic polyisocyanate a) is obtained by the phosgenation of aniline/formaldehyde condensates, and contains 0 to 60 wt. % of difunctional 2,4'-diisocyanato-diphenylmethane and 0 to 50 wt. % of higher oligomers having a functionality of greater than 2.

* * * * *